(12) United States Patent
Hill et al.

(10) Patent No.: US 7,159,928 B2
(45) Date of Patent: Jan. 9, 2007

(54) VEHICLE DOOR INSERT

(75) Inventors: Matthew Hill, Irvine, CA (US); Henrik Fisker, Newport Beach, CA (US); David Woodhouse, Newport Coast, CA (US); Christopher Wheeler, Newport Beach, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 10/905,511

(22) Filed: Jan. 7, 2005

(65) Prior Publication Data

US 2006/0152036 A1   Jul. 13, 2006

(51) Int. Cl.
*B60J 5/00* (2006.01)
*B60J 9/00* (2006.01)

(52) U.S. Cl. ............... 296/153; 296/146.7; 296/146.11

(58) Field of Classification Search ............. 296/146.7, 296/146.1, 146.5, 146.11, 146.12, 153; 292/336.3, 292/92, 340, 341.18, DIG. 14; 49/40, 41, 49/36; 70/228, 224, 208

See application file for complete search history.

(56) References Cited

U.S. PATENT DOCUMENTS

| 4,378,658 | A  | * | 4/1983  | DeLorean ..................... 49/379 |
| 4,782,742 | A  | * | 11/1988 | Yott et al. .................... 454/152 |
| 5,529,370 | A  | * | 6/1996  | Veit ......................... 296/146.7 |
| 5,902,006 | A  | * | 5/1999  | Janker et al. ................ 296/153 |
| 6,474,721 | B1 | * | 11/2002 | Nishikawa et al. ....... 296/146.6 |
| 6,616,216 | B1 | * | 9/2003  | Furuyama et al. ........ 296/146.7 |
| 6,676,193 | B1 | * | 1/2004  | Hanagan ................ 296/146.11 |
| 6,843,085 | B1 | * | 1/2005  | Dimig ......................... 70/237 |
| 6,929,309 | B1 | * | 8/2005  | Radu et al. .............. 296/146.7 |
| 7,059,658 | B1 | * | 6/2006  | Ziegler et al. ........... 296/146.7 |

* cited by examiner

*Primary Examiner*—Dennis H. Pedder
*Assistant Examiner*—Melissa Black
(74) *Attorney, Agent, or Firm*—Frank A. MacKenzie; Brooks Kushman P.C.

(57) ABSTRACT

A door for use in a vehicle and including an interior panel portion having an outer boundary facing toward an interior portion of the vehicle and including an opening. An insert positioned within at least a portion of the opening.

20 Claims, 4 Drawing Sheets

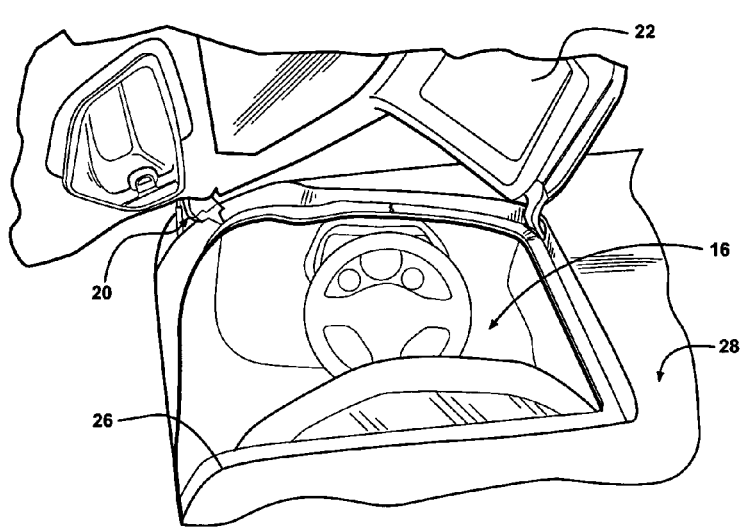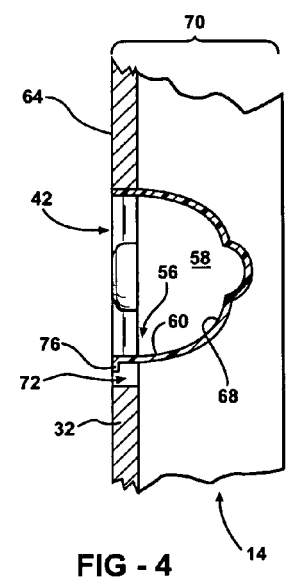
FIG - 2
FIG - 4

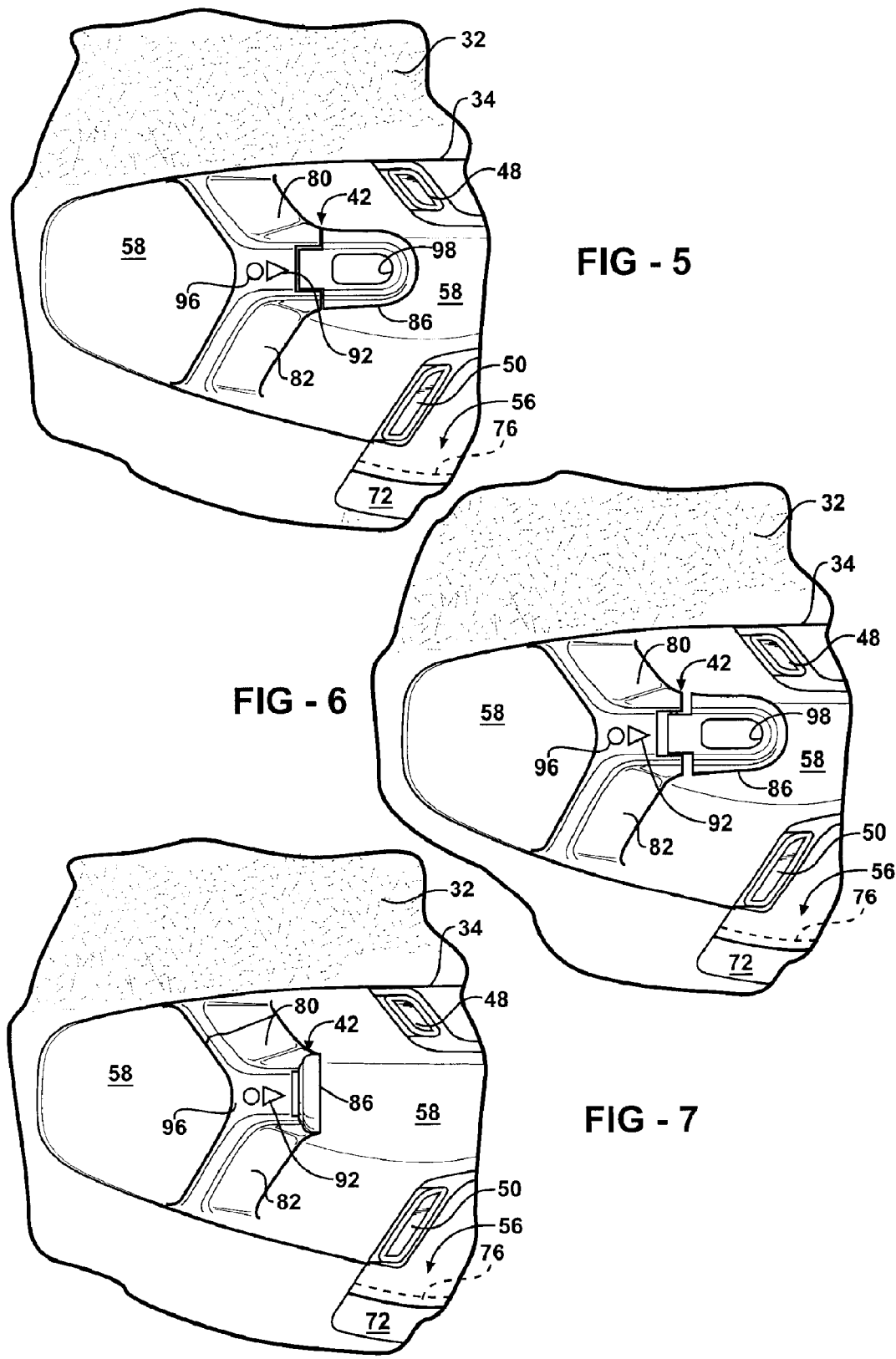

VEHICLE DOOR INSERT

BACKGROUND OF THE INVENTION

1. Field of the Invention

The present invention relates to vehicle doors of the type used in passenger vehicles.

2. Background Art

Passenger vehicles, such as automobiles, include doors through which passengers enter the vehicle. Some doors include features like an armrests and a door release for supporting the passenger's arm when sitting in the vehicle and opening the door when closed.

SUMMARY OF THE INVENTION

One non-limiting aspect of the present invention relates to a door for use in a vehicle. The door may comprise an interior panel portion having an outer boundary facing toward an interior portion of the vehicle and including an opening. The outer boundary portion may include comforting material and include aesthetically appealing shapes and contours.

In accordance with one non-limiting aspect of the present invention, an insert may be positioned within at least a portion of the opening. The insert may include the insert having a door release for opening the door. The door release may be supported within the insert by first and second legs and include an elongated body portion connected to each leg such that the door release is Y-shaped.

In accordance with one non-limiting aspect of the present invention, the door release may include a handle connected to the body portion which is actuatable for opening the door when closed. For example, the handle may be actuatable by being pulled and/or by being pulled outwardly.

In accordance with one non-limiting aspect of the present invention, the door release may include an illuminable indicator on the body portion for indicating if the door is locked or unlocked and/or a button on the body portion for locking the door.

In accordance with one non-limiting aspect of the present invention, the insert may include an armrest defined at least partially by a portion of the insert extending inwardly relative to the outer boundary of the interior panel. For example, the insert may be U-shaped and have a cavity portion which includes a planar surface extending inwardly from the outer boundary of the interior panel upon which the passenger may rest their arm. Alternatively, the armrest may be at least partially defined by a portion extending outwardly relative to the outer boundary of the interior panel such that the armrest includes a planar surface extending inwardly and outwardly relative to outer boundary of the interior panel.

In accordance with one non-limiting aspect of the present invention, at least a portion of the inwardly extending portion of the insert extends beyond a forward and rearward side of the door release such that at least a portion of the inwardly extending portion is visible at the forward and rearward side of the door release from the interior portion of the vehicle so as to cause the door release to appear to be floating within the insert cavity.

In accordance with one non-limiting aspect of the present invention, the insert may cover less than all of the opening and include a ledge along at least a portion of a perimeter of the insert not covered by the insert for providing a handgrip for pulling the door closed.

In accordance with one non-limiting aspect of the present invention, the insert may include at least one air duct for providing an opening towards the interior portion of the vehicle for directing air flow.

In accordance with one non-limiting aspect of the present invention, the door may include a door lift assembly for lifting the door upwardly such that the door rotates vertically about one end.

In accordance with one non-limiting aspect of the present invention, at least a portion of the door extends laterally at a roofline of the vehicle to define a portion of a vehicle roof such that the interior portion of the vehicle is exposed through the vehicle roof when the door is opened.

One aspect of the present invention relates to a method of opening and closing a passenger door hinged only at one side to a vehicle such that the door opens and closes by rotating vertically about the hinged side. The method may include closing the door by pulling downwardly on a ledge on an insert of the door to cause the door to rotate vertically about the hinged side, wherein the insert being positioned within an opening of an interior panel portion of the door and covering only a portion of the opening wherein the ledge is located on a backside of the insert and reachable through a gap between the insert and the opening.

In accordance with one non-limiting aspect of the present invention, the method may include opening the door if an illuminated locked and unlocked indicator on a door release indicates the door is unlocked, wherein the door release is integrated with the insert.

In accordance with one non-limiting aspect of the present invention, the method may including pulling rearwardly on an elongated body portion of the door release to open the door and/or pulling outwardly on an elongated body portion of the door release to open the door.

The above features and advantages, along with other features and advantages of the present invention, are readily apparent from the following detailed description of the invention when taken in connection with the accompanying drawings.

BRIEF DESCRIPTION OF THE DRAWINGS

FIG. 2 illustrates a top-view of a vehicle roof and door in accordance with one non-limiting aspect of the present invention;

FIG. 4 illustrates a cross-section view of the insert in accordance with one non-limiting aspect of the present invention;

FIG. 5 illustrates the door release in accordance with one non-limiting aspect of the present invention;

FIG. 6 illustrates the door release actuated in accordance with one non-limiting aspect of the present invention; and FIG. 7 illustrates the door release actuated in accordance with one non-limiting aspect of the present invention.

DETAILED DESCRIPTION OF THE PREFERRED EMBODIMENT(S)

Figure 1:
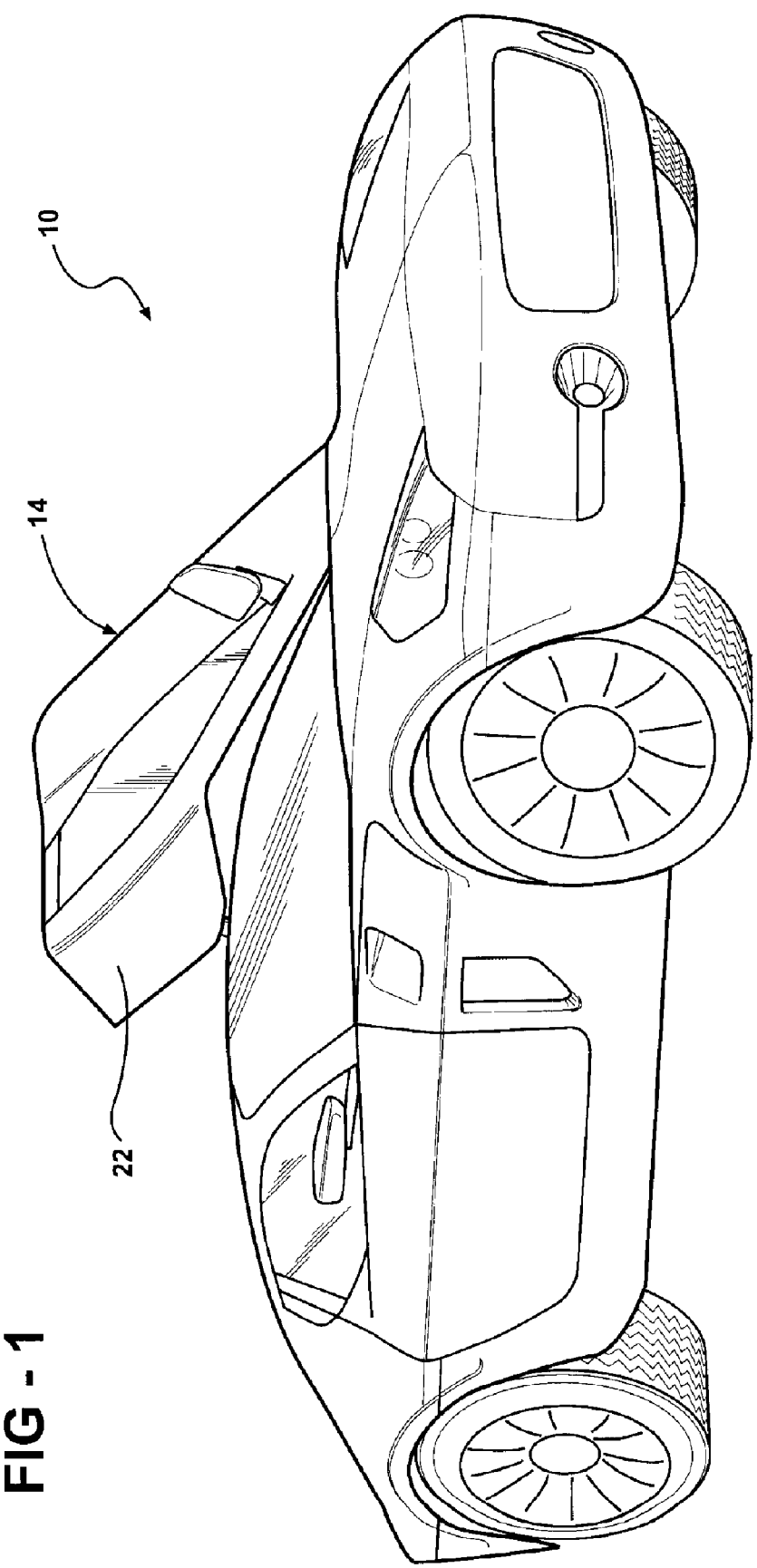
FIG. 1 illustrates a vehicle having a door in accordance with one non-limiting aspect of the present invention.

FIG. 1 illustrates a vehicle 10 having a door 14 in accordance with one non-limiting aspect of the present invention. The door 14 is generally referred to as a passenger door as it may be opened and closed to control access to an interior passenger compartment 16 of the vehicle, as shown in more detail with FIG. 2.

In accordance with one non-limiting aspect of the present invention, the door 14 may include a lift assembly 20 for rotating the door 14 about its forward end. In more detail, the lift assembly 20 assists and/or controls rotation of the door 14 in a generally vertical plane such that it may be rotated upwardly to an open position shown in FIG. 1 and downwardly therefrom to a closed position. In addition, a portion 22 of the door may extend laterally at a roofline 26 of a vehicle roof 28 to define a portion of a vehicle roof wherein the interior 16 is exposed through the roof 28 if the door 14 is opened.

The lift assembly 20 may comprise any number of components and connecting features for securing the door 14 to the vehicle 10 and providing its vertical rotation. For example, the present invention contemplates the lift assembly 20 being an electrically operable unit which electrically lifts and lowers the door 14, a pneumatically operable unit which assists a user in lifting and lowering the door 14, and the like. Accordingly, the present invention contemplates a number of features for the lift assembly 20 and is not intended to be limited to the configuration shown in FIG. 1.

Figure 3:
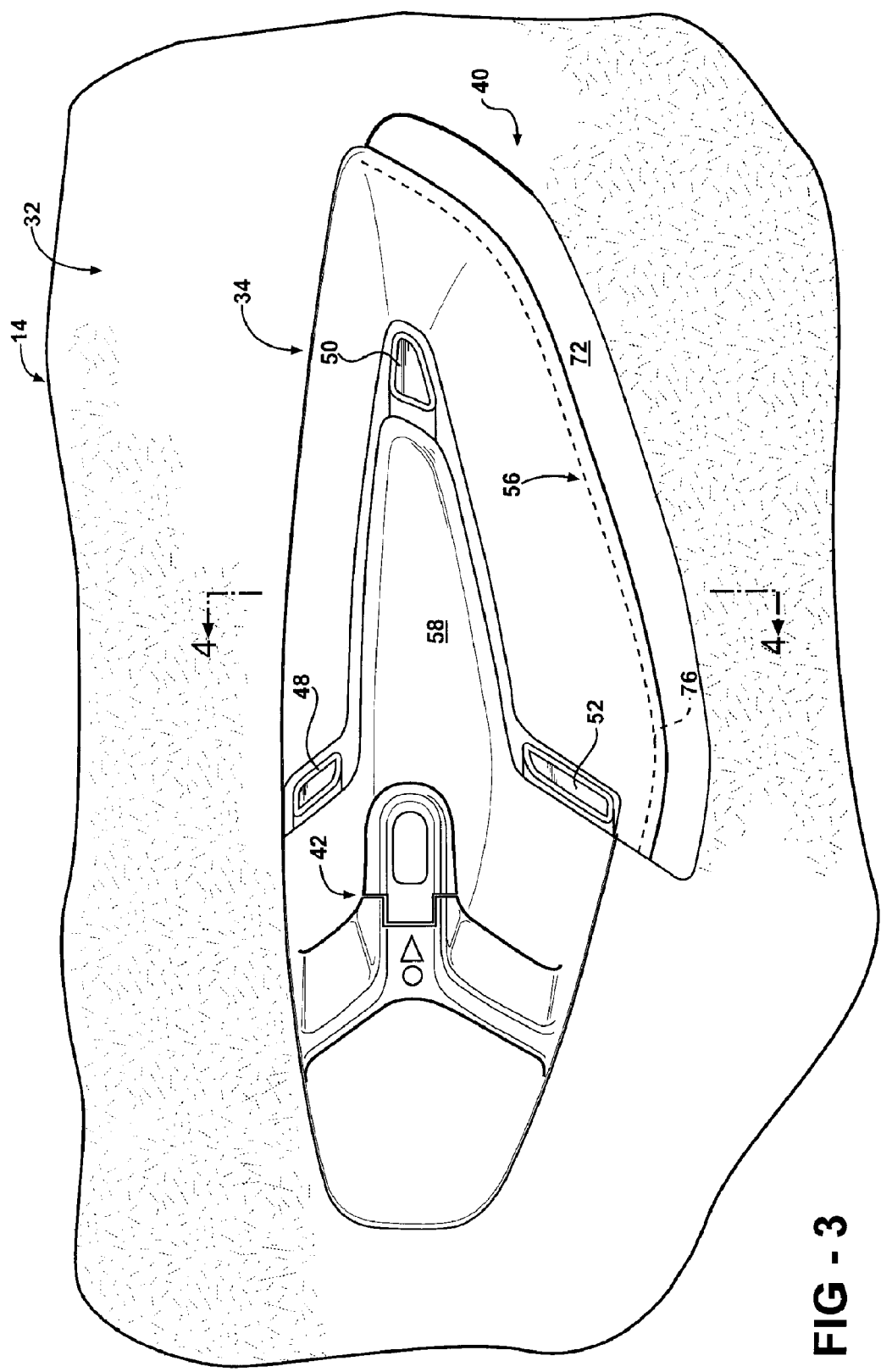
FIG. 3 illustrates an interior view of the door in accordance with one non-limiting aspect of the present invention.

FIG. 3 illustrates an interior view of the door 14 in accordance with one non-limiting aspect of the present invention. As shown, the door 14 may include an interior panel portion 32 and an insert 34. The panel portion 32 may comprise any shape and contour and include comforting material, such as leather trim or the like, and may be affixed to a metallic, plastic, or other framing material for support.

In accordance with one non-limiting aspect of the present invention, the door panel 32 includes an opening 40 for receiving the insert 34. The insert 34 may comprises any number of features and components which may be inserted together as an assembly or separately as individual units.

In accordance with one non-limiting aspect of the present invention, the insert 34 includes a door release 42. The door release 42 is a release mechanism or electromechanical device which may communicate with the door lift assembly 20 to control opening and closing the door 14. The present invention contemplates any number of features and configurations for the door release 42, including a mechanically actuated unit which pulls on cables, wires, or other features (not shown) for actuating the door lift assembly 20 to open the door 14 and/or an electrically actuated unit which transmits electrical signals for actuating the door lift assembly 20 to open the door 14.

In accordance with one non-limiting aspect of the present invention, the insert 34 may include one or more air ducts 48–52 for directing air flow into the interior 16 of the passenger compartment. The air ducts 48–52 may be configured with tubing or other features in the door 14 and ports of the vehicle 10 for receiving air flow and directing the air flow into the passenger compartment. The air ducts 48–52 may include covers, vents, and/or other features for directing the air flow. Moreover, the air ducts 48–52 may be rotatable, pivotable, or include other characteristics for further assisting in directing the air flow.

In accordance with one non-limiting aspect of the present invention, the insert 34 may include an armrest 56. The armrest 56 may be integral with a cavity portion 58 of the insert 34 such that it corresponds with a generally planar surface 60 upon which an occupant of the vehicle may rest their arm. FIG. 4 illustrates a cross-section view of the insert 14 in accordance with one non-limiting aspect of the present invention and shows the planar surface 60 in more detail.

As shown, the armrest 56 extends inwardly from an outer boundary 64 of the door panel 32 toward an outer wall 68 of the cavity 58 so as to define the planar surface 60 therebetween upon which the occupant may rest their arm. Alternatively, however, the present invention contemplates the armrest 56 may also extend outwardly (not shown) from the outer boundary 64 of the door panel 32 such that planar surface extends inwardly and outwardly relative to the outer boundary 64.

Advantageously, the extension of the armrest inwardly from the outer boundary 64 allows the present invention to take advantage of free space within an interior 70 of the door 14. In particular, it allows the present invention to provide an integrated look where the armrest 56 and door release 42 are mounted flush with the outer boundary 64 of the door panel 32.

In accordance with one non-limiting aspect of the present invention, the armrest 56 depth may be in the range of 1 to 9 inches so as to provide sufficient depth for the passenger arm. Likewise, the armrest 56 may have a length in the range of 1–9 inches to provide sufficient surface area when combined with its depth to support the passenger arm. Of course, the present contemplates the surface area and depth of the armrest 56 having any suitable dimension and is not intended to be limited to the foregoing.

Moreover, the present invention contemplates varying the depth of the armrest 56 inwardly from the outer boundary 64 as a function of an overall width and contour of the door 14. For example, the present invention contemplates the armrest 56 having a larger depth if the door width 70 is larger and a smaller depth if the door width 70 is smaller. Still further, the present invention contemplates extending the armrest 56 outwardly from the outer boundary (not show) as a function of the overall width 70 of the door so as to provide sufficient planar surface area if the door width 70 is too small to do so and/or if other features in the door prevent sufficiently extending the armrest 56 inwardly relative to the outer boundary 64, i.e., the door 14 may include functional or structural elements which limit the depth of the insert.

The present invention contemplates the armrest 56 including any number of features, such as leather trim, rubber surfaces, and the like. Moreover, the present invention contemplates the armrest 56 and insert 34 including any number of shapes and cross-sections and is not intended to be limited to the U-shape cross-section shown in FIG. 4 or the polygonal outline shown in FIG. 3.

In accordance with one non-limiting aspect of the present invention, the insert 34 covers less than all of the opening 40 such that a gap 72 is formed between at least a portion of the perimeter of the insert 34 and a corresponding perimeter of the opening 40. In accordance with one non-limiting aspect of the present invention, a ledge 76 may be formed on the insert 34 along at least a portion of the perimeter corresponding with the gap 72 so as to provide a handgrip upon which the passenger may grasp to pull the door 14 in a downward direction from the open door position shown in FIG. 1. In accordance with one non-limiting aspect of the present invention, the ledge 76 may be formed on a backside of the insert 34 so as to conceal it from view.

FIG. 5 illustrates the door release 42 in accordance with one non-limiting aspect of the present invention. The door release 42, as described above, may be a mechanical, electrical, or electromechanical device for assisting and/or controlling opening of the door. In accordance with one non-limiting aspect of the present invention, the door release 42 includes a pair of legs 80–82 and an elongated body portion 86. The elongated body portion 86 may attach to the legs 80–82 to provide a Y-shaped outline for the door release 42.

In accordance with one non-limiting aspect of the present invention, the insert cavity portion 58 may extend beyond a forward and rearward side of the door release 42 such that at least a portion of the cavity 58 is visible at the forward and rearward side of the door release 42 from the interior portion 16 of the vehicle 10. Advantageously, the mounting of the door release 42 in this manner causes it to float over the cavity 58 to provide an aesthetically pleasing design.

As shown in FIG. 3, the door release 42 may be flush with the outer boundary 64 of the door 14 to further enhance its stylistic and aesthetic appearance. However, the present invention contemplates other configurations for the door release 42, including mounting the door release 42 inwardly or outwardly of the outer boundary 64 of the door panel 32. In particular, the present invention contemplates integrating the door release 42 with the outer wall 68 of the cavity and/or to shape the legs 80–82 inwardly or outwardly from a connection point at the outer boundary 64 of the door panel 32 so as to mount the door release 42 inwardly or outwardly of the outer boundary 64 of the door panel 32.

In accordance with one non-limiting aspect of the present invention, the door release 42 includes an illuminable lock indicator 92 having different illumination characteristics depending one whether the door 14 is locked or unlocked so as to visually communicate to the passenger whether the door 14 is locked or unlocked. For example, the indicator may include a light emitting diode (LED) or similar feature which illuminates with a first color (red) when the door is locked and a second color (blue) when the door 14 is unlocked.

In accordance with one non-limiting aspect of the present invention, the door release 42 may include a button 96 for locking and unlocking the door 14. The button 96 may communicate mechanically or electrically with a locking device (not shown) which controls the locking and unlocking of the door 14. The present invention also contemplates the door release 42 including other features to provide other functionality to the passengers, such as window control or seat adjustment buttons and features.

In accordance with one non-limiting aspect of the present invention, the elongated body portion 86 of the door release 42 includes a handle 98 for actuating the door release 42 to open the door. The handle 98 may include any number of shapes and configurations which the passenger may grasp to actuate to the door release 42.

FIG. 6 illustrates the door release 42 configured in accordance with one non-limiting aspect of the present invention wherein the handle 98 is actuated with rearward movement. As shown, the rearward movement slightly separates the handle 98 from a central portion of the elongated body portion 86 to open the door, such as by electrically altering a switch and/or by pulling on a cable.

FIG. 7 illustrates the door release 42 being configured in accordance with one non-limiting aspect of the present invention wherein the handle 98 is actuated by inward rotation. In more detail, the handle 98 may be rotated about a pivot at the rearward end of the central portion to open the door 14, such as by electrically altering a switch and/or by pulling on a cable.

While the best mode for carrying out the invention has been described in detail, those familiar with the art to which this invention relates will recognize various alternative designs and embodiments for practicing the invention as defined by the following claims.

What is claimed is:

1. A door for use in a vehicle, the door comprising:
   an interior panel portion having an outer boundary facing toward an interior portion of the vehicle and including an opening; and
   an insert positioned within at least a portion of the opening, the insert having a door release and an armrest, the armrest being at least partially defined by a portion of the insert extending inwardly relative to the outer boundary of the interior panel.

2. The door of claim 1 wherein the insert is U-shaped.

3. The door of claim 1 wherein at least a portion of the inwardly extending portion extends beyond a forward and rearward side of the door release such that at least a portion of the inwardly extending portion is visible at the forward and rearward side of the door release from the interior portion of the vehicle.

4. The door of claim 1 wherein the door release is supported within the insert by first and second legs and includes an elongated body portion connected to each leg such that the door release is Y-shaped.

5. The door of claim 1 wherein the door release includes a handle connected to the body portion, the handle being actuatable for opening the door when closed.

6. The door of claim 5 wherein the handle is actuatable by pulling rearwardly on the handle.

7. The door of claim 5 wherein the handle is actuatable by pulling outwardly on the handle.

8. The door of claim 5 wherein the door release includes an illuminable indicator on the body portion for indicating if the door is locked or unlocked.

9. The door of claim 8 wherein the door release includes a button on the body portion for locking the door.

10. The door of claim 1 wherein the insert covers less than all of the opening and includes a ledge along at least a portion of a perimeter of the insert not covered by the insert, the ledge providing a handgrip for pulling the door closed.

11. The door of claim 10 wherein the ledge is on a backside of the insert and extends inwardly therefrom.

12. The door of claim 1 wherein the armrest is at least partially defined by a portion extending outwardly relative to the outer boundary of the interior panel such that the armrest includes a planar surface extending inwardly and outwardly relative to outer boundary of the interior panel.

13. The door of claim 1 wherein the insert includes at least one air duct, the air duct providing an opening towards the interior portion of the vehicle for directing air flow.

14. The door of claim 1 further comprising a door lift assembly for lifting the door upwardly.

15. The door of claim 14 wherein the door lift assembly rotates the door vertically.

16. The door of claim 15 wherein at least a portion of the door extends laterally at a roofline of the vehicle to define a portion of a vehicle roof such that the interior portion of the vehicle is exposed through the vehicle roof when the door is opened.

17. A method of opening and closing a passenger door hinged only at one side to a vehicle such that the door opens and closes by rotating vertically about the hinged side, the method comprising: closing the door by pulling downwardly on a ledge on an insert of the door to cause the door to rotate vertically about the hinged side, the insert being positioned within an opening of an interior panel portion of the door and covering only a portion of the opening wherein the ledge is located on a backside of the insert and reachable through a gap between the insert and the opening.

18. The method of claim 17 further comprising opening the door if an illuminated locked and unlocked indicator on a door release indicates the door is unlocked, wherein the door release is integrated with the insert.

19. The method of claim 18 further comprising pulling rearwardly on an elongated body portion of the door release to open the door.

20. The method of claim 18 further comprising pulling outwardly on an elongated body portion of the door release to open the door.

* * * * *